United States Patent
Simske et al.

(10) Patent No.: US 9,633,215 B2
(45) Date of Patent: Apr. 25, 2017

(54) APPLICATION OF DIFFERENTIAL POLICIES TO AT LEAST ONE DIGITAL DOCUMENT

(75) Inventors: Steven J. Simske, Ft. Collins, CO (US); Helen Balinsky, Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 418 days.

(21) Appl. No.: 13/810,718

(22) PCT Filed: Sep. 21, 2010

(86) PCT No.: PCT/US2010/049669
§ 371 (c)(1),
(2), (4) Date: Jan. 17, 2013

(87) PCT Pub. No.: WO2012/039704
PCT Pub. Date: Mar. 29, 2012

(65) Prior Publication Data
US 2013/0174216 A1  Jul. 4, 2013

(51) Int. Cl.
*H04L 29/00*  (2006.01)
*G06F 21/62*  (2013.01)
*G06F 17/30*  (2006.01)

(52) U.S. Cl.
CPC .... *G06F 21/6209* (2013.01); *G06F 17/30011* (2013.01)

(58) Field of Classification Search
CPC ................................................. G06F 21/6209
See application file for complete search history.

(56) References Cited

U.S. PATENT DOCUMENTS

| | | | |
|---|---|---|---|
| 7,281,273 B2 * | 10/2007 | Strom et al. | ............ 726/27 |
| 2002/0152389 A1 | 10/2002 | Horita et al. | |
| 2005/0091261 A1 | 4/2005 | Wu et al. | |
| 2007/0168671 A1 | 7/2007 | Takenaka et al. | |

(Continued)

FOREIGN PATENT DOCUMENTS

| | | |
|---|---|---|
| CN | 101512479 | 8/2009 |
| WO | WO-0201271 A1 | 1/2002 |

OTHER PUBLICATIONS

Xiao Y et al: Text region extraction in a document image based on the Delaunay tessellation, Pattern Recognitiion, Elsevier, GB, vol. 36, No. 3, 2003, pp. 799-809.

(Continued)

*Primary Examiner* — Brandon Hoffman
*Assistant Examiner* — Helai Salehi
(74) *Attorney, Agent, or Firm* — Mannava & Kang, P.C.

(57) ABSTRACT

In a method (300) for applying differential policies on at least one digital document (120a-120n) having a plurality of atomic units (122a-122n) among a plurality of workflow participants (110a-110n), in which the atomic units are assigned with at least one of a plurality of the differential policies, the at least one digital document is tessellated (304) to identify the atomic units and the at least one of the differential policies assigned to the atomic units. In addition, the atomic units are aggregated (306) according to the at least one of the differential policies assigned to the atomic units and respective sets of keys are associated (308) to the aggregated atomic units, in which common sets of keys are associated with the aggregated atomic units assigned with the same policies.

11 Claims, 7 Drawing Sheets

(56) References Cited

U.S. PATENT DOCUMENTS

| | | |
|---|---|---|
| 2007/0219915 A1 | 9/2007 | Hatano et al. |
| 2008/0066185 A1* | 3/2008 | Lester et al. ............... 726/27 |
| 2008/0172718 A1 | 7/2008 | Bradley |
| 2008/0270311 A1 | 10/2008 | Peterka et al. |
| 2009/0116643 A1 | 5/2009 | Hatano et al. |
| 2009/0150761 A1 | 6/2009 | Sawicki et al. |
| 2010/0046749 A1 | 2/2010 | Hatano et al. |

OTHER PUBLICATIONS

Yue Iu et al: Word Grouping in Document Images Based on Voronoi Tessellation. In: Lecture Notes in Computer Science, 2004.
Supplementary European search report, issued Apr. 15, 2015, in related EP application 10857602.6.

* cited by examiner

APPLICATION OF DIFFERENTIAL POLICIES TO AT LEAST ONE DIGITAL DOCUMENT

CROSS REFERENCE TO RELATED APPLICATIONS

The present application contains common subject matter with copending and commonly assigned PCT Application Serial No.: PCT/US2010/049669, entitled "Providing Differential Access to a Digital Document", filed on the same date herewith, the disclosure of which is hereby incorporated by reference in its entirety.

BACKGROUND

In recent years, there has been a growing trend to move away from printing information on paper toward the use of digital documents, which contain digital content. Examples of digital documents include, for instance, portable document format (pdf) documents, electronic spreadsheets, electronic drawings, documents generated through use of a word processing application, and html pages. The digital documents may also include composite documents that include a mixture of different types of formats.

With paper documents, an individual's signature or other handwritten marks are used to determine whether various changes or additions to the documents were made by an authorized individual. However, such modifications are not possible or are inconvenient with digital documents because these types of modifications will require the individual to print the digital document, sign or otherwise mark the document, and scan the marked document to prove that the modifications were made by the individual. This manner of controlling access to the documents, both paper and electronic, is easily attacked and may easily be counterfeited.

Various techniques have been proposed to prevent or reduce attacks and counterfeiting of digital documents. These techniques typically employ a database upon which the digital documents are stored and access to the database, or a network to which the database is connected, is controlled by preventing access to the database or network to a user unless that user possesses some secret information, such as, a user identification and password. As such, in order for these security techniques to enforce access control on the digital documents, users are required to be granted access to the database or network. However, access to the database or network is typically prohibited or undesirable for various security reasons, such as, to prevent access by contractors or non-employees of the corporate or government entity that owns the database or network. Often, for simplicity and compliance purposes, access control is provided in whole or not at all.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Disclosed herein are a method and apparatus for applying differential policies, such as, security policies, on at least one digital document among a plurality of workflow participants. The digital document(s) may comprise a composite document, which is composed of a variety of individual addressable and accessible parts (units) in the form of separate files or addressable file fragments. For example, the units may include individual files, groups of files, or file fragments, such as, html fragments, xml nodes, presentation slides, word processing text boxes, parts of a spreadsheet document, an electronic object containing drawings, an electronic object having flash video capabilities, etc. The individual addressable and accessible parts are recited as "atomic units" throughout the present disclosure. In addition, the atomic units of a particular digital document may comprise the same format or different formats from each other.

Differential security policies may define, for instance, whether atomic units are to be encrypted, whether and which workflow participants are to be granted access to the atomic units, different levels of access to be granted to the workflow participants, etc. The differential security policies may further define actions to be applied to the atomic units in response to various conditions being met. For instance, the differential security policies may define that atomic units are to be encrypted when the atomic units include specified information or metadata. As another example, the differential security policies may define that different workflow participants are to be granted different access levels to the atomic units, for instance, a particular workflow participant may be granted a read only access level to a atomic unit when that atomic unit includes a particular value. Thus, for instance, some of the atomic units, such as, individual files, may be encrypted as a whole, some of the atomic units, such as, file fragments, may be encrypted individually, and some of the atomic units of the at least one digital document may not be encrypted. The determination as to whether the atomic units are encrypted may be based upon whether the atomic units include one or more terms that elicit application of one or more policies. For instance, one or more atomic units may be identified as being selected for encryption if the one or more atomic units include the one or more terms.

In instances where multiple policies apply to the same atomic units, one or more rules may be employed to resolve conflicts between the policies. The one or more rules may include, for instance, separate application of actions from each policy in a specified or random order, application of action from the highest security requirement policy, application of the actions defined in the highest level policy in a given class, etc.

The method and apparatus disclosed herein are also configured to apply the differential policies while substantially minimizing the number of encryption, decryption, signature and verification keys employed to apply the differential policies. The number of keys may substantially be minimized through a tessellation of one or more digital documents based upon the security policies. Generally speaking, the tessellation pulls the digital document(s) apart into atomic units that have been assigned different policies, for instance, according to one or more security needs. These atomic units, which may comprise parts from one or more digital documents/files, are aggregated for security (encryption) and are reassembled when decrypted. The atomic units may also be assigned different policies for different workflow participants. Thus, the same atomic unit may be assigned a first policy for a first workflow participant and a second policy for a second workflow participant.

Through implementation of the method and apparatus disclosed herein, the atomic units in one or more digital documents that are assigned the same policies may be identified and aggregated together. In addition, common sets of keys may be generated for/assigned to those atomic units. Thus, by way of example in which the one or more digital documents include ten (10) atomic units, which, following the tessellation disclosed herein, results in three (3) different policies, instead of ten different sets of keys for the atomic units, only three different sets of keys are required to enable enforcement of the differential security policies. In this regard, the number of keys required to provide and enforce the differential security policies as well as the number of individual encryption/decryption, signing and verification operations required to be performed to enable enforcement of the differential security policies may substantially be minimized.

The method and apparatus disclosed herein also provide differential access to the atomic units among the workflow participants following aggregation of the atomic units and association of the sets of keys to the atomic units. In one embodiment, at least one of the workflow participants is outside of at least one of a common and a uniformly-secure environment. In other words, for instance, multiple users may be accessing the document in environments with different levels of security. In addition, the differential access may be provided through control of the types of and numbers keys supplied to each of the workflow participants for the digital documents or the one or more atomic units contained in the digital documents. In one regard, therefore, the differential levels of access granted to the workflow participants may be provided and enforced in a relatively simple and inexpensive manner.

Throughout the present disclosure, the term "n" following a reference numeral is intended to denote an integer value that is greater than 1. In addition, the terms "a" and "an" are intended to denote at least one of a particular element.

Figure 1:
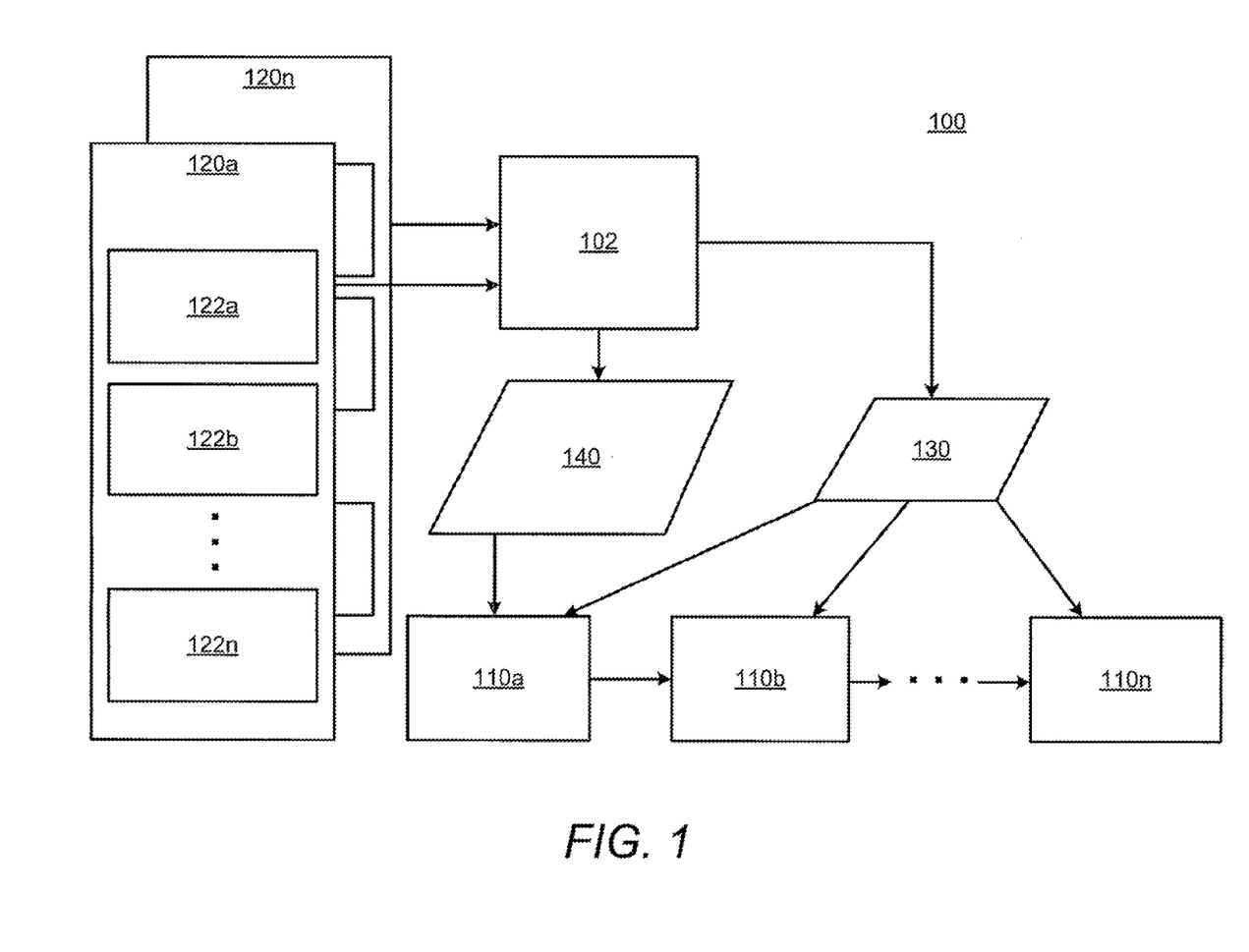
FIG. 1 illustrates a simplified schematic diagram of a digital document workflow, according to an embodiment of the present invention.

With reference first to FIG. 1, there is shown a simplified diagram of a digital document workflow 100, according to an embodiment of the present invention. It should be apparent to those of ordinary skill in the art that the diagram depicted in FIG. 1 represents a generalized illustration and that other components may be added or existing components may be removed, modified or rearranged without departing from a scope of the digital document workflow 100.

The digital document workflow 100 is depicted as including a differential policy application apparatus 102 and a plurality of workflow participants 110a-110n. The digital document workflow 100 is also depicted as including a plurality of digital documents 120a-120n, each containing a plurality of atomic units 122a-122n. Generally speaking, the differential policy application apparatus 102 is configured to apply differential policies on at least one of the digital documents 120a-120n among the workflow participants 110a-110n. In addition, the differential policy application apparatus 102 is configured to differentially control access to the atomic units 122a-122n by the workflow participants 110a-110n based upon the policies assigned to the atomic units 122a-122n for the workflow participants 110a-110n.

The differential policy application apparatus 102 may comprise a hardware device, such as, a computer, a server, a circuit, etc., configured to perform various functions in differentially applying policy on the atomic units 122a-122n. The various functions that the differential policy application apparatus 102 performs are discussed in greater detail hereinbelow.

The workflow participants 110a-110n generally represent computing devices through which the workflow participants 110a-110n may receive, and when granted sufficient access, to at least one of view, edit, and acknowledge one or more of the atomic units 122a-122n. The computing devices may comprise, for instance, personal computers, laptop computers, tablet computers, personal digital assistants, cellular telephones, etc.

According to an embodiment, the differential policy application apparatus 102 is in a secure environment where the digital document owner/creator/master has access to the policy application apparatus 102 and some or all the computing devices of the workflow participants 110a-110n are outside of the secure environment. In other words, some or all of the workflow participants 110a-110n may not access the digital document(s) 120a-120n from a common database that controls access to the digital document(s) 120a-120n. Instead, the digital document(s) 120a-120n is supplied to and among the workflow participants 110a-110n through, for instance, e-mail, a shared server, direct file transfer, removable storage medium, etc. Some or all of the workflow participants 110a-110n may not be granted access to the secure environment of the policy application apparatus 102 in instances where such access is impractical or prohibited.

The digital documents 120a-120n may comprise any reasonably suitable type of document in digital form and may be in the same or different formats with respect to each other. Examples of suitable document types include, for instance, portable document format, spreadsheet, JPEG or any other image, word processing document, hypertext markup language (html), etc. In addition, the atomic units 122a-122n generally comprise individual addressable elements within the digital document 120, such as, signature lines, cells or columns within a spreadsheet, paragraphs, graphics boxes, etc. As discussed in greater detail herein below, the differential policy application apparatus 102 is configured to identify the atomic units 122a-122n and at least one differential policy assigned to the atomic units 122a-122n. In addition, the differential policy application apparatus 102 is configured to identify differential access levels to be granted to each of the workflow participants 110a-110n based upon the policies assigned to the atomic units 122a-122n. Moreover, the differential policy application apparatus 102 is configured to identify (select) and (optionally) supply one or more keys 130 to the workflow participants 110a-110n based upon the determined access levels. In addition, the differential policy application apparatus 102 is configured to reduce and/or substantially minimize the number of keys and the number of individual encryption/decryption, signing and verification operations required to be performed to provide and enforce differential security policies on the atomic units 122a-122n by multiple workflow participants 110a-110n, as described in greater detail herein below.

In addition, the first workflow participant 110a may supply the digital document(s) 120a-120n to a second workflow participant 110b, for instance, by the first workflow participant e-mailing the digital document to the second participant or by mailing a CD containing the digital document, etc., by the second workflow participant 110b to a third workflow participant 110c, and so forth. Alternatively, one or more of the workflow participants 110a-110n may retrieve the digital document(s) 120a-120n. According to an example, the order in which the digital document(s) 120a-120n is supplied between at least some of the workflow participants 110a-110n is predetermined. In another example, the order in which the workflow participants 110a-110n access the digital document(s) 120a-120n may not be predetermined. In addition, because the differential policy application apparatus 102 may be inside of some secure environment of a document master/owner/creator and at least some of the workflow participants 110a-110n are outside of the common secure environment, the differential policy application apparatus 102 need not be involved in the supply and/or retrieval of the digital document 120 by the workflow participants 110b-110n following the first communication of the encrypted and signed document(s) 140 to the first workflow participant 110a.

Figure 2:
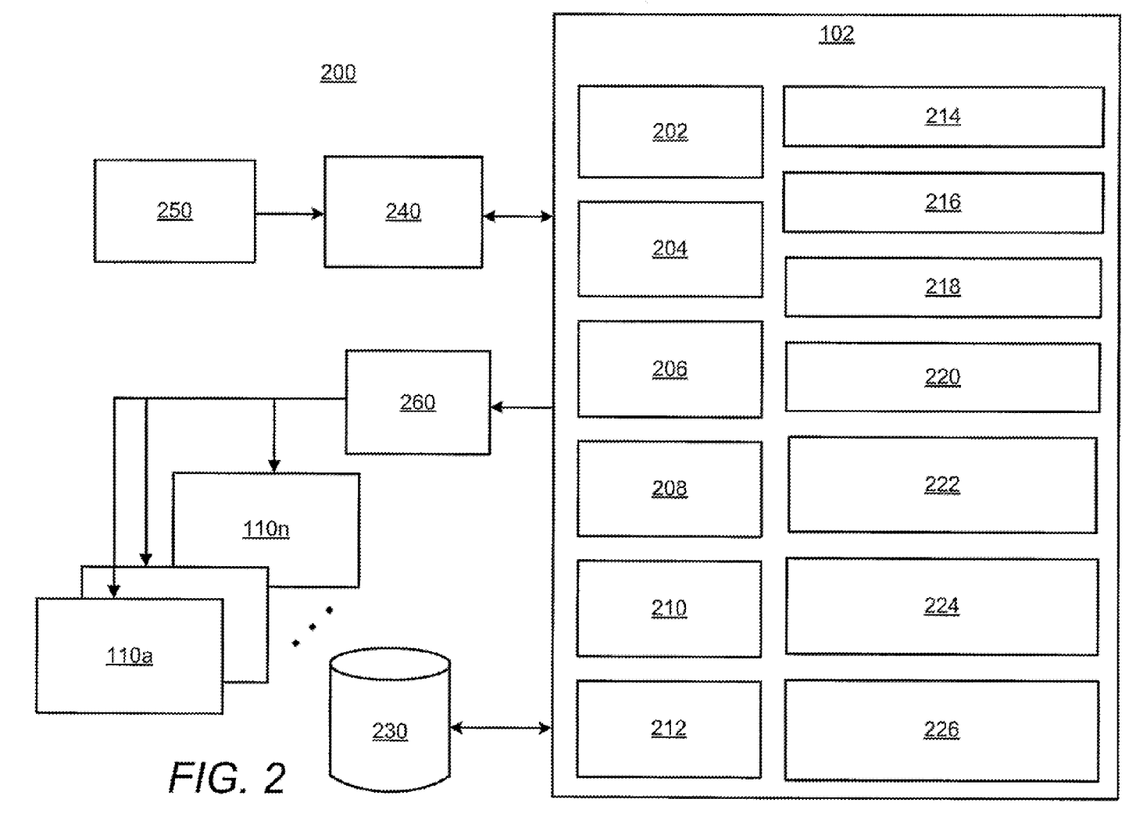
FIG. 2 shows a simplified block diagram of a differential policy application system containing the differential policy application apparatus depicted in FIG. 1, according to an embodiment of the present invention.

With particular reference now to FIG. 2, there is shown a simplified block diagram of a differential policy application system 200 containing the differential policy application apparatus 102 depicted in FIG. 1, according to an example. It should be apparent to those of ordinary skill in the art that the block diagram depicted in FIG. 2 represents a generalized illustration and that other components may be added or existing components may be removed, modified or rearranged without departing from a scope of the differential access providing system 200.

As shown in FIG. 2, the differential policy application apparatus 102 includes a user interface module 202, a policy identification (ID) module 204, an aligning module 206, a tessellating module 208, an aggregating module 210, an access level identification module 212, a key association module 214, an encryption module 216, a signing module 218, a key identification module 220, a key generation/derivation module 222, a key supplying module 224, and a digital document supplying module 226. The modules 202-226 may comprise software modules, hardware modules, or a combination of software and hardware modules. Thus, in one embodiment, one or more of the modules 202-226 comprise circuit components. In another embodiment, one or more of the modules 202-226 comprise software code stored on a computer readable storage medium, which is executable by a processor.

In any regard, the differential policy application apparatus 102 is configured to be implemented and/or executed by a processor 240. Thus, for instance, the differential policy application apparatus 102 may comprise an integrated and/or add-on hardware device of a computing device comprising the processor 240. As another example, the differential policy application apparatus 102 may comprise a computer readable storage device upon which software for each of the modules 202-226 is stored and executed by the processor 240.

As further shown in FIG. 2, the processor 240 is configured to receive input from an input apparatus 250. The input apparatus 250 may comprise, for instance, a user interface through which a user may supply digital documents 120 into the differential policy application apparatus 102. The input apparatus 250 may also comprise a user interface through which a user may define access levels to be granted to one or more of the atomic units 122a-122n to each of the workflow participants 110a-110n. In any regard, the processor 240 is configured to execute or implement the differential policy application apparatus 102 to differentially control access to the one or more of the atomic units 122a-122n by the workflow participants 110a-110n.

The differential access providing system 200 also includes an output interface 260 through which keys 130 and the encrypted and signed document(s) 140 may be supplied to one or more of the workflow participants 110a-110n. There are different mechanisms through which keys may be distributed to the corresponding workflow participants. Non-exhaustive examples of these different mechanisms include:

1) The appropriate keys 130 may be e-mailed (in encrypted form) directly to each workflow participant 110a-110n by the document master/author/creator.

2) The workflow participants 110a-110n may be required to login to a cloud-base service where the keys 130 are stored to retrieve the appropriate keys 130.

3) The appropriate keys 130 may stored on removable storage media, such as, compact disks, portable thumb drives, etc., in encrypted or unencrypted form and distributed to the workflow participants 110a-110n manually.

4) The workflow participants 110a-110n may already be in possession of the appropriate keys 130 from a previous use.

5) The appropriate keys 130 may be contained within the digital document itself.

6) The appropriate keys may be accessed through a security proxy, including, for example, a biometric such as voice, iris, and/or fingerprint identification and validation.

The keys 130 and the signed document(s) 140 may be stored in a data store 230 prior to delivery to the workflow participants 110a-110n. The data store 230 may comprise volatile and/or non-volatile memory, such as DRAM, EEPROM, MRAM, phase change RAM (PGRAM), Memristor, flash memory, and the like. In addition, or alternatively, the data store 230 may comprise a device configured to read from and write to a removable media, such as, a floppy disk, a CD-ROM, a DVD-ROM, or other optical or magnetic media.

Figure 3A:
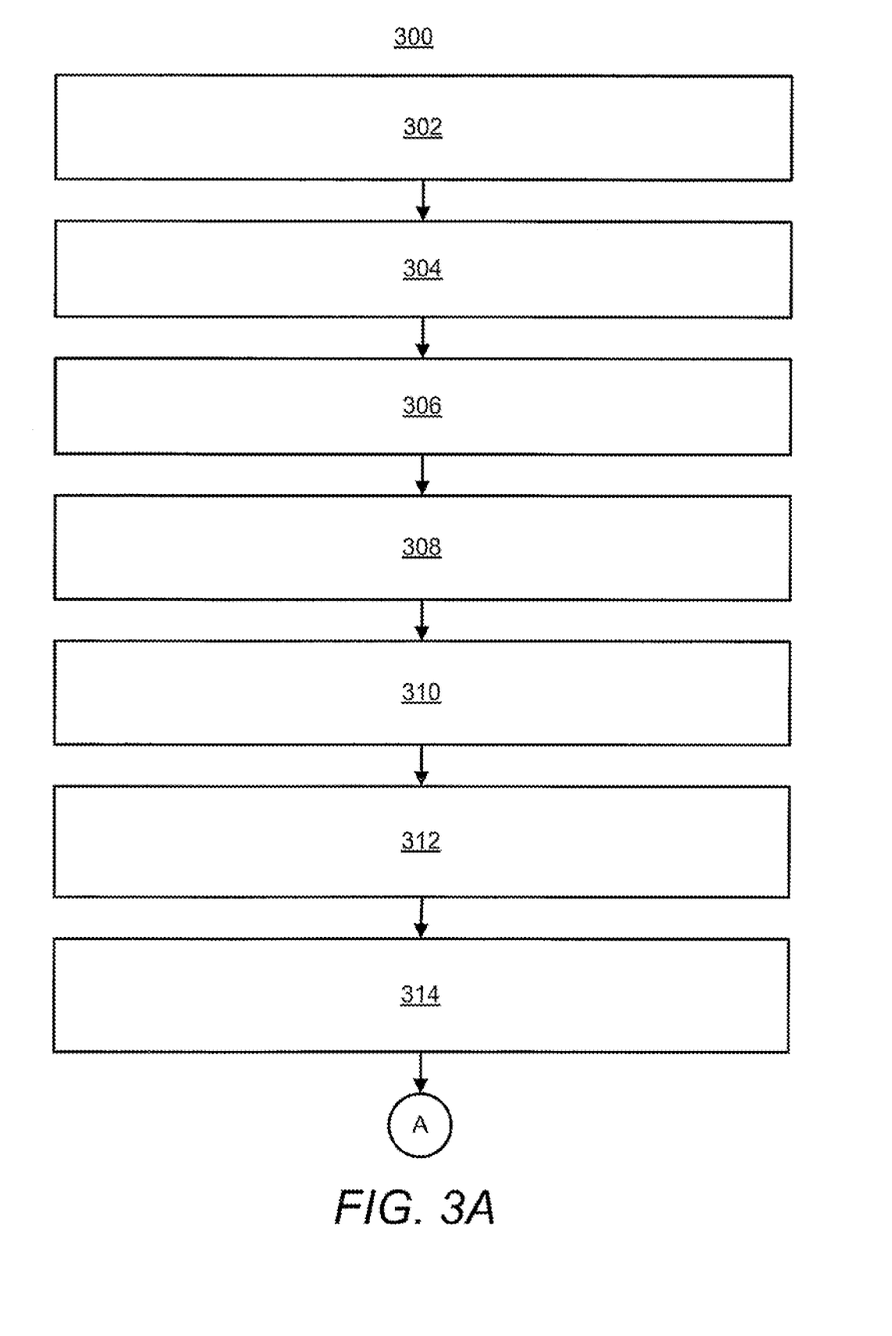
FIGS. 3A and 3B, collectively, show a flow diagram of a method for applying differential policies on at least one digital document among a plurality of workflow participants, according to an embodiment of the present invention.
Figure 3B:
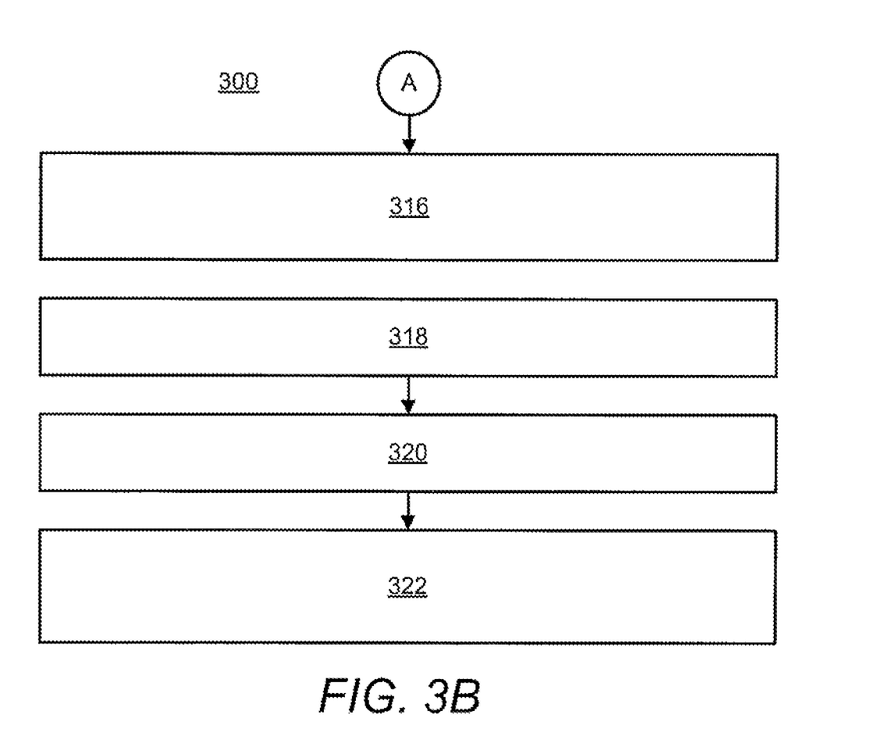

Various manners in which the modules 202-226 of the differential policy application apparatus 102 may be implemented are described in greater detail with respect to FIGS. 3A and 3B, which collectively depict a flow diagram of a method 300 for applying differential policies on at least one digital document 120a-120n among a plurality of workflow participants 110a-110n, according to an embodiment of the invention. It should be apparent to those of ordinary skill in the art that the method 300 represents a generalized illustration and that other steps may be added or existing steps may be removed, modified or rearranged without departing from a scope of the method 300.

The description of the method 300 is made with particular reference to the differential policy application apparatus 102 depicted in FIGS. 1 and 2. It should, however, be understood that the method 300 may be implemented in an apparatus that differs from the differential policy application apparatus 102 without departing from the scope of the method 300.

At step 302, at least one digital document 120a-120n on which differential policies are to be applied among a plurality of workflow participants 110a-110n is accessed, in which the at least one digital document 120a-120n is composed of a plurality of atomic units 122a-122n. For instance, the differential policy application apparatus 102 receives the digital document(s) 120a-120n from the input apparatus 250 through the user interface module 202. As another example, a user instructs the differential policy application apparatus 102 to access the digital document(s) 120a-120n from, for instance, the data store 230. As another example, a new digital document(s) 120a-120n is created from a template, such as, for instance, an application form process.

In addition, at step 302, the policies assigned to the atomic units 122a-122n may be identified, for instance, by the policy identification module 204. The policy identification module 204 may identify the policies assigned to the atomic units 122a-122n the receipt of information from a user pertaining to the policies. As another example, the policies assigned to the atomic units 122a-122n may have been previously stored in the data store 230 and the policy identification module 204 may identify the policies by accessing and retrieving the policy information from the data store 230.

At step 304, the at least one digital document 120a-120n is tessellated to identify the atomic units 122a-122n and the at least one of the differential policies assigned to the atomic units 122a-122n, for instance, by the tessellating module 208. More particularly, for instance, the tessellation module 208 pulls the digital document(s) 120a-120n apart into atomic units 122a-122n. As described above, the atomic units 122a-122n have been assigned different policies, for instance, according to one or more security needs. These atomic units 122a-122n may comprise parts from one or more digital documents/files 120a-120n. A result of the tessellation is that the atomic units 122a-122n and the differential policies assigned to the atomic units 122a-122n are identified.

Figure 4:
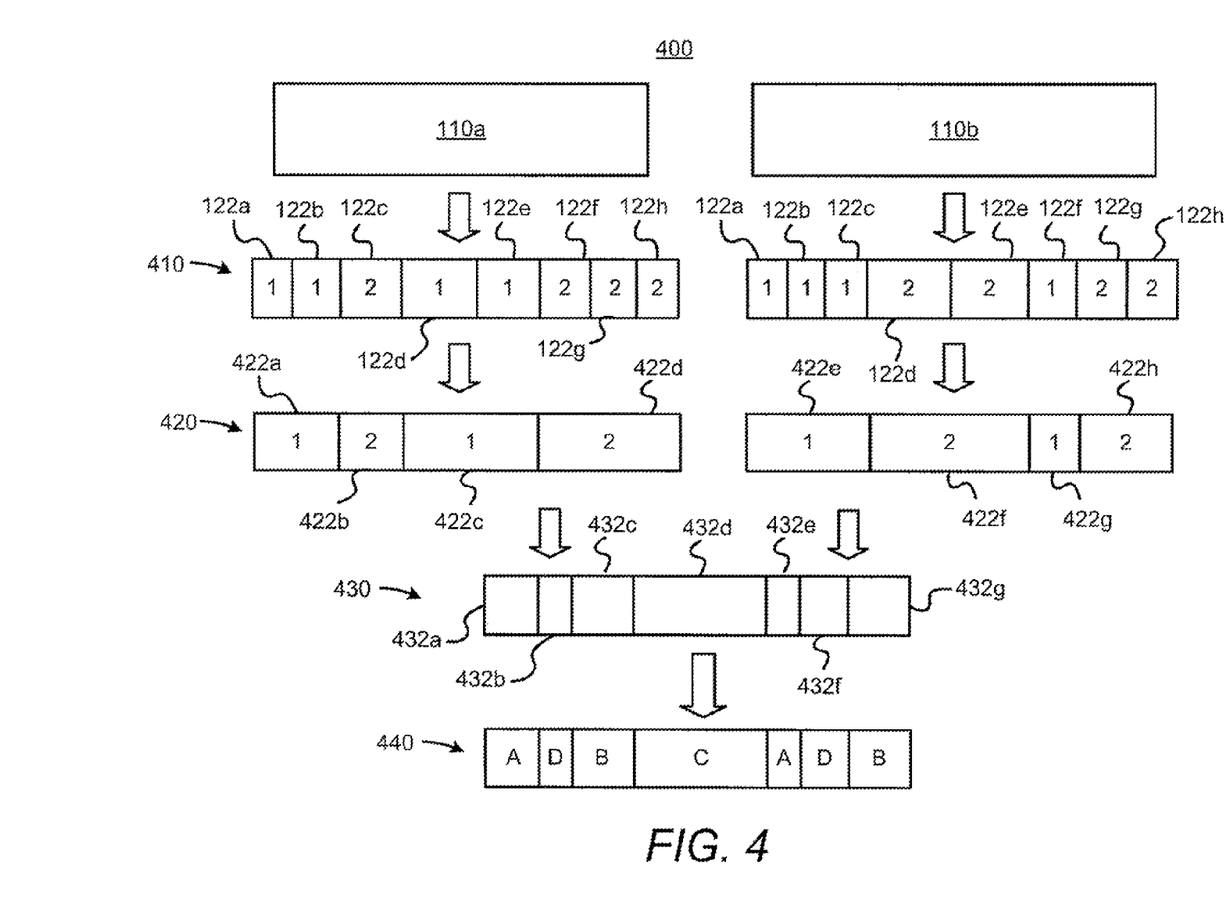
FIG. 4 graphically depicts a manner in which some of the steps of the method depicted in FIGS. 3A and 3B may be implemented, according to an embodiment of the present invention.

An example of the atomic units 122a-122n and the policies assigned to the atomic units 122a-122n for a first workflow participant A 110a and a second workflow participant. B 110b are depicted in a first row 410 of FIG. 4. FIG. 4, more particularly, graphically depicts a manner in which some of the steps of the method 300 may be implemented on a plurality of atomic units 122a-122n of at least one digital document 120a-120n for a pair of workflow participants 110a and 110b. It should be clearly understood that the example depicted in FIG. 4 is merely provided for illustrative purposes and should therefore not be construed as limiting any of the embodiments disclosed herein. In addition, although only two workflow participants 110a and 110b and two policies (1 and 2) have been depicted in FIG. 4, it should be clearly understood that principles of the method 300 may be implemented with any number of workflow participants and any number of policies.

In the diagram 400, differential policies have been assigned to the atomic units 122a-122h for the first workflow participant A 110a and the second workflow participant B 110b. By way of example, a first policy (1) may comprise a policy in which the workflow participant is able to read the atomic unit and the second policy (2) may comprise a policy in which the workflow participant is able to modify the atomic unit. As shown in row 410, the atomic units 122a, 122b, 122d, and 122e have been assigned with the first policy and the atomic units 122c and 122f-122h have been assigned with the second policy for the first workflow participant A 110a. In addition, the atomic units 122a-122c and 122f have been assigned with the first policy and the atomic units 122d, 122e, 122g, and 122h have been assigned with the second policy for the second workflow participant B 110b.

As also shown in the row 410 of FIG. 4, the atomic units 122a-122n may be aligned according to the differential policies assigned to the atomic units 122a-122n for each of the workflow participants 110a-110n, for instance, by the aligning module 206. Alternatively, the tessellating module 208 may align the atomic units 122a-122n at step 304. An example of sequential atomic units 122a-122h that have been aligned according to the differential policies assigned to the atomic units 122a-122n is depicted in the diagram 400 at row 420.

Figure 3C:
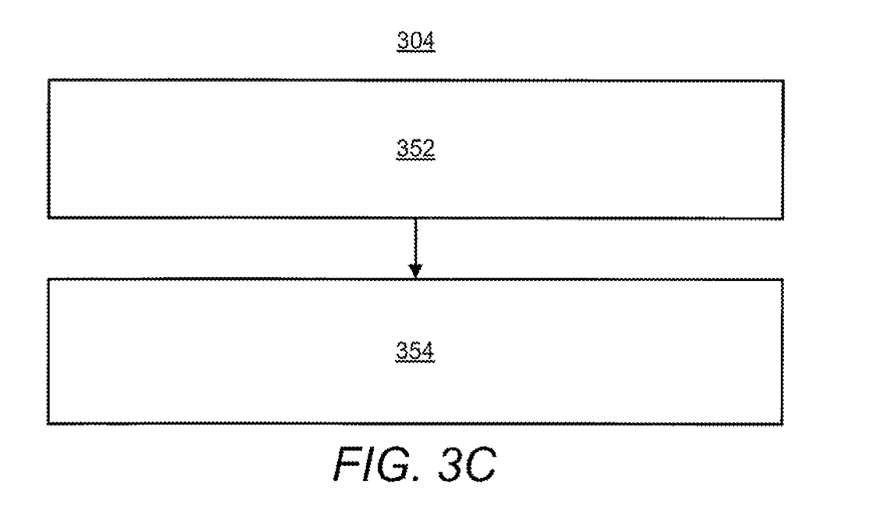
FIG. 3C shows a more detailed illustration of step 304 in the method depicted in FIG. 3A, according to an embodiment of the present invention.

According to an embodiment, step 304 includes additional steps for combining sequentially similar atomic units 122a-122n for each of the workflow participants 110a-110n. This embodiment is depicted in FIG. 3C, which shows a more detailed illustration of step 304 according to this embodiment. As shown therein, at step 352, for each of the workflow participants 122a-122n, a determination as to whether two or more sequential atomic units 122a-122n have been assigned the same policies is made. In addition, at step 354, in response to a determination that two or more sequential atomic units 122a-122n have been assigned the same policies, the sequential atomic units 122a-122n are combined into respective policy regions.

The combination of the sequential atomic units 122a-122n is depicted in row 420 in FIG. 4. More particularly, and as shown therein, the first and second atomic units 122a and 122b of the first workflow participant 110a have been combined into a first policy region 422a because the same policy (1) applies to both of these atomic units 122a and 122b and these atomic units 122a and 122b are sequentially arranged. Likewise, atomic units 122d and 122e of the first workflow participant 110a have been combined into a third policy region 422c and atomic units 122f-122h of the first workflow participant 110a have been combined into a fourth policy region 422d. In addition, the sequential atomic units 122a-122h to which these same policies applying to the second workflow participant 110b have similarly been combined into policy regions 422e-422h.

In addition, in instances where multiple policies apply to the same atomic units 122a-122n, the tessellating module 208 may employ one or more rules to resolve conflicts between the policies. The one or more rules may include, for instance, separate application of actions from each policy in a specified or random order, application of action from the highest security requirement policy, application of the actions defined in the highest level policy in a given class, etc. Thus, for instance, the tessellating module 208 may employ the one or more rules to determine which of the policies to apply to the atomic units 122a-122n.

At step 306, the atomic units 122a-122n are aggregated according to the at least one of the differential policies assigned to the atomic units, for instance, by be aggregating module 210. In other words, the aligned atomic units 122a-122n for two or more of the workflow participants 110a-110n are tiled with each other to determine how the policies assigned to the atomic units 122a-122n for the workflow participants 110a-110n relate to each other into single logical units of policy. With reference back to FIG. 4, row 430 depicts an example of the aggregated atomic units 122a-122h for workflow participants A and B 110a and 110b.

As shown in the diagram 400, a first aggregated region 432a is composed of part of the first policy region 422a of the first workflow participant 110a and the first policy region 422e of the second workflow participant 110b. In addition, a second aggregated region 432b is composed of the second policy region 422b of the first workflow participant 110a and part of the first policy region 422e of the second workflow participant 110b. A third aggregated region 432c is composed of part of the second policy region 422b of the first workflow participant 110a and the second policy region 422f of the second workflow participant 110b. A fourth aggregated region 432d is composed of part of the third policy region 422c of the first workflow participant 110a and the second policy region 422f of the second workflow participant 110b. A fifth aggregated region 432e is composed of part of the third policy region 422c of the first workflow participant 110a and the third policy region 422g of the second workflow participant 110b. A sixth aggregated region 432f is composed of part of the fourth policy region 422d of the first workflow participant 110a and the third policy region 422g of the second workflow participant 110b. A seventh aggregated region 432g is composed of part of the fourth policy region 422d of the first workflow participant 110a and part of the fourth policy region 422h of the second workflow participant 110b.

In addition, at step 306, the aggregating module 210 aggregates the atomic units 122a-122n according to the differential policies assigned to the atomic units 122a-122n in other words, the aggregating module 210 determines which of the aggregated regions have been assigned with the same policies. In the diagram 400, the differential policies are depicted in row 440 with the letters "A", "B", "C", and "D". As shown therein, the letter "A" represents aggregated regions 432a, 432d, and 432e to which atomic units 122a-122n have been assigned the first policy (1) for both workflow participants 110a and 110b, the letter "B" represents aggregated regions 432c and 432g to which atomic units 122a-122n have been assigned the second policy (2) for both workflow participants 110a and 110b, the letter "C" represents the aggregated region 432c to which the an atomic unit has been assigned the first policy (1) for the first workflow participant 110a and the second policy (2) for the second workflow participant 110b, and the letter "D" represents aggregated regions 432b and 432f to which the atomic units have been assigned the second policy (2) for the first workflow participant 110a and the first policy (1) for the second workflow participant 110b.

At step 308, respective sets of keys are associated to the aggregated atomic units 122a-122n (or aggregated regions 432a-432g), for instance, by the key association module 214. More particularly, the key association module 214 may associate respective sets of keys to the single logical units of policy of the aggregated atomic units 122a-122n. Thus, for instance, in the example depicted in FIG. 4, the aggregated atomic units 122a-122n identified by the letter "A" may be assigned with a first set of keys, the aggregated atomic units 122a-122n identified by the letter "B" may be assigned with a second set of keys, the aggregated atomic units 122a-122n identified by the letter "C" may be assigned with a third set of keys, and the aggregated atomic units 122a-122n identified by the letter "D" may be assigned with a fourth set of keys.

Each of the sets of keys includes at least one of an encryption key, or alternatively a pair of encryption-decryption keys, and a pair of signature and verification keys. In addition, for one or more of the atomic units 122a-122n that contain no sensitive or private material, the set of keys for those atomic units 122a-122n may only include a signature—verification pair. In addition, each of the sets of keys may be generated and/or derived by the key generation/derivation module 222.

At step 310, a level of access from a plurality of access levels (differential access rights) to the atomic units 122a-122n to be simultaneously granted to each of the workflow participants 110a-110n is identified based upon the differential policies assigned to the atomic units 122a-122n, for instance, by the access level identification module 212. More particularly, the access level identification module 212 may determine the access levels from the policies assigned to the atomic units 122a-122n. Thus, for instance, the access level identification module 212 may access the policies assigned to the atomic units 122a-122n and may identify the access levels to be granted to the workflow participants 110a-110n from the policies. In addition, the access level identification module 212 may store the access levels in the data store 230.

According to an example, the workflow participants 110a-110n may be granted one of a "no access" level, a "read only access" level, and a "modify access" level to each of the one or more atomic units 122a-122n. As such, for instance, a workflow participant 110a may be granted different levels of access to the atomic units 122a-122n contained in an encrypted and signed digital document 140. In addition, a first workflow participant 110a may be granted a different level of access to one or more of the atomic units 122a-122n than a second workflow participant 110b.

For atomic units 122a-122n under the "no access" level, a workflow participant 110a is granted the ability to receive one or more of the atomic units 122a-122n, but is not granted the ability to open or otherwise read or modify these atomic units. As such, for instance, the workflow participant 110a-110n may access the digital document 120 containing the atomic units 122a-122n to which the workflow participant 110a has been granted the "no access" level, but may not be able to read or modify those atomic units 122a-122n. This workflow participant 110a may, however, be required to authenticate the atomic units 122a-122n to which the workflow participant 110a has been granted the no access level as well as all other ones of the atomic units 122a-122n. This situation may occur, for instance, when the workflow participant 110a has been granted access to view one or mare of the atomic units 122a-122n, but has not been granted access to view other ones of the atomic units 122a-122n. The workflow participant 110a may then be required to transfer the digital document 120 to one or more subsequent workflow participants 110b-110n who may have been granted access rights to those atomic units 122a-122n that are inaccessible by the workflow participant 110a. As another example, this situation may occur for instance, when the workflow participant 110a has been granted the "no access" level to each of the atomic units 122a-122n contained in the encrypted and signed digital document 140, but has been selected to receive the appropriate keys to access the digital document 140 at a later time.

For atomic units 122a-122n under the "read only access" level, a workflow participant 110a is granted the ability to open and access the atomic units 122a-122n of the encrypted and signed digital document 140 to which the workflow participant 110a has been granted the "read only access" level. However, the workflow participant 110a is not authorized to modify those atomic units 122a-122n. In one regard, a workflow participant 110b that receives the encrypted and signed digital document 140 may determine, and must automatically verify on reception, when the atomic units 122a-122n have been modified by an unauthorized workflow participant 110a, as discussed in greater detail herein below.

For atomic units 122a-122n under the "modify access" level, a workflow participant 110a is granted the authorization to both read and modify the atomic units 122a-122n to which the workflow participant has been granted the "modify access" level. In one regard, the workflow participant 110a may be supplied with corresponding signature keys to enable the workflow participant 110a to sign some or all of the atomic units 122a-122n following modification and encryption of the atomic units 122a-122n. In addition, a second workflow participant 110b identified to receive the encrypted and signed digital document 140 from a first workflow participant 110a may have been provided with an appropriate verification key, which the second workflow participant 110b may use to determine whether the first workflow participant 110a was authorized to modify one or more of the atomic units 122a-122n. The second workflow participant 110b, if granted at least the read only access, may also be provided with an appropriate decryption key to be able to decrypt the modified atomic units 122a-122n.

At step 312, an identification of which subsets of the sets of keys 130 associated at step 308 are to be supplied to each of the workflow participants 110a-110n based upon the access levels granted to the atomic units 122a-122n to the workflow participants 110a-110n is made, for instance, by the key identification module 220. Thus, for instance, for a first policy, a first workflow participant 110a may be identified to receive a first subset of keys 130 and a second workflow participant 110b may be determined to receive a second subset of keys 130. Likewise, for a second policy, the first workflow participant 110a may be determined to receive a different subset set of keys 130 from the second workflow participant 110b, and so forth.

According to an embodiment, for those atomic units 122a-122n that workflow participants 110a-110n are to be granted the "no access" level, the key identification module 220 may determine that those workflow participants 110a-110n are to receive the verification keys for those atomic units 122a-122n without the encryption, the decryption, or signature keys for those atomic units 122a-122n. For those atomic units 122a-122n that workflow participants 110a-110n are to be granted the "read only access" level, the key identification module 220 may determine that those workflow participants 110a-110n are to receive the decryption keys and the verification keys, without the encryption and signature keys, for those atomic units 122a-122n. For those atomic units 122a-122n that workflow participants 110a-110n are to be granted the "modify access" level, the key identification module 220 may determine that those workflow participants 110a-110n are to receive the encryption keys, the decryption, the verification keys and the signature keys for those atomic units 122a-122n.

At step 314, each of the workflow participants 110a-110n is supplied with one or more subsets of keys 130 based upon the identification made at step 312, for instance, by the key supplying module 224. The key supplying module 224 may supply the keys 130 to the workflow participants 110a-110n through any suitable means, as described in greater detail hereinabove. For instance, the key supplying module 224 may supply the keys through email, through delivery of the keys in a removable storage medium, or through other secure communication channels.

Figure 5:
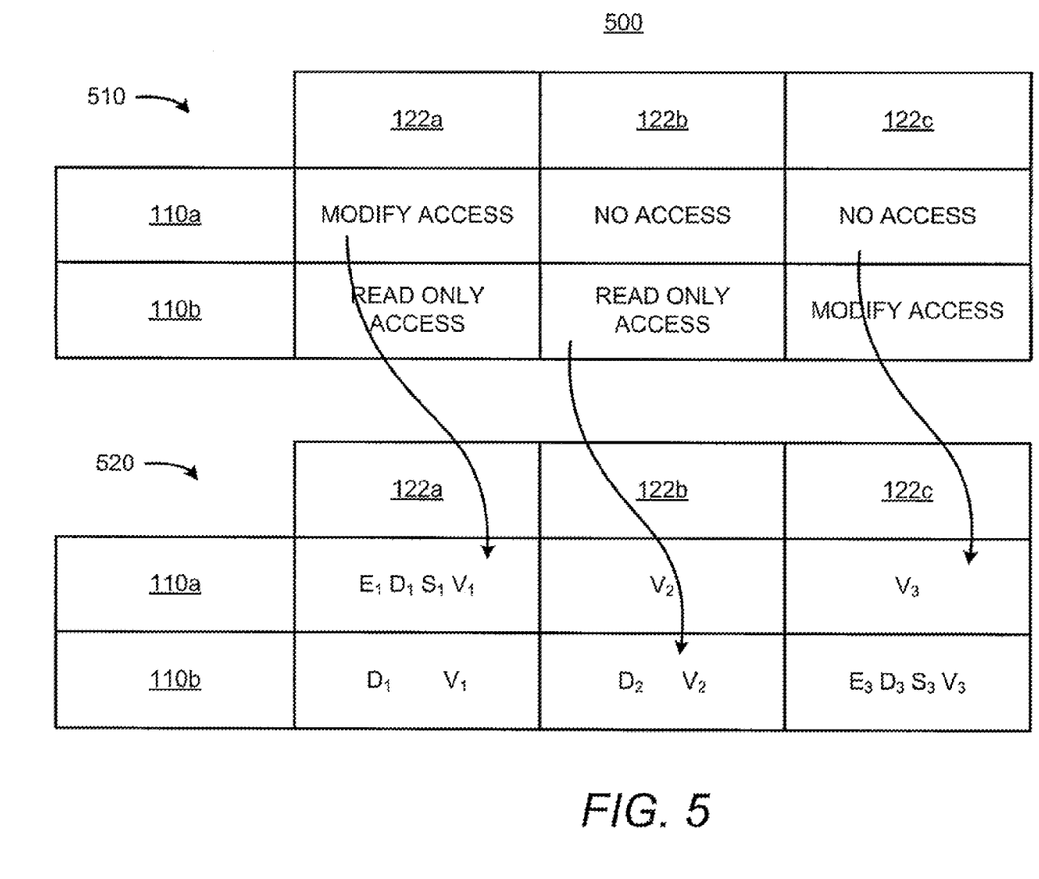
FIG. 5 shows a diagram of a manner in which differential access is provided to multiple workflow participants, according to an embodiment of the present invention.

Turning now to FIG. 5, there is shown a diagram 500 of a manner in which differential access may be provided to multiple workflow participants 110a and 110b, according to an embodiment. It should be understood that the diagram 500 is a generalized illustration and that other elements may be included therein without departing from a scope of the diagram 500. Thus, for instance, although two workflow participants 110a and 110b have been depicted in the diagram 500, it should be understood that various principles disclosed therein may be applied to any number of workflow participants 110c-110n.

The diagram 500 includes two charts 510 and 520. Both of the charts 510 and 520 depict a simple case of two workflow participants 110a and 110b and three atomic units 122a-122c. The first chart 510 depicts an example of the access levels that each of the workflow participants 110a and 110b is provided to each of the atomic units 122a-122c. The second chart 520 depicts the corresponding sets of keys supplied to the workflow participants 110a and 110b based upon the level of access that the workflow participants 110a and 110b have been granted for each of the atomic units 122a-122c. In the example depicted in FIG. 5, the first workflow participant 110a has been granted the modify access level to the first atomic unit 122a and a no access level to the second and third atomic units 122b and 122c. In addition, the second workflow participant 110b has been granted the read only access level to the first and second atomic units 122a and 122b and the modify access level to the third atomic unit 122c.

As shown in the second chart 520, for the first atomic unit 122a, the first workflow participant 110a is supplied with encryption and decryption keys ($E_1$, $D_1$) and the signature and verification keys ($S_1$, $V_1$) for that atomic unit 122a. In addition, the second workflow participant 110b is supplied with just the decryption and verification keys ($D_1$, $V_1$) for the first atomic unit 122a. For the second and third atomic units 122b and 122c, the first workflow participant 110a is supplied with just the verification keys ($V_2$, $V_3$) for those atomic units 122b and 122c. For the second atomic unit 122b, the second workflow participant 110b is supplied with the decryption and verification keys ($D_2$, $V_2$) for that atomic unit 122b. For the third atomic unit 122c, the second workflow participant 110b is supplied with the encryption and decryption keys ($E_3$, $D_3$) and the signature and verification keys ($S_3$, $V_3$) for that atomic unit 122c.

In instances where the second workflow participant 110b is intended to access the first atomic unit 122a following modification by the first workflow participant 110a, the second workflow participant 110b is supplied with a second set of keys to be able to authenticate the modification to the at least one atomic unit 122a by the first workflow participant 110a. The second set of keys may differ from the first set of keys to thus enable the second workflow participant 110b to verify the signature of the first workflow participant 110a.

With reference back to FIG. 3, at step 316, a determination as to which of the atomic units 122a-122n are to be encrypted and signed is made based upon the policies assigned to the atomic units 122a-122n, for instance, by the encryption module 216. In addition, at step 318, the atomic units 122a-122n that are to be encrypted are encrypted using encryption keys respectively associated with the aggregated atomic units 122a-122n (or regions 432a-432g) at step 308, for instance, by the encryption module 218. The encryption module 216 may use any standard or proprietary encryption mechanism, such as, for instance, symmetric AES encryption, Twofish encryption, asymmetric RSA, etc., in encrypting the tessellated atomic units 122a-122n. According to an embodiment, each of the tessellated atomic units 122a-122n may be encrypted using respective specially generated, derived and/or assigned encryption key, as generated and/or derived by the key generation/derivation module 222.

At step 320, the encrypted atomic units 122a-122n are signed using one or more signature keys, for instance, by the signing module 218. The encrypted and tessellated atomic units 122a-122n may be signed, for example, through use of a Digital Signature Algorithm, RSA based signatures, etc. According to an embodiment, the tessellated atomic units 122a-122n are signed using specially assigned, generated or derived signature keys.

At step 322, the digital document(s) 120a-120n containing the encrypted and signed atomic unit(s) 122a-122n is supplied to at least a first workflow participant 110a, for instance, by the document supplying module 226.

Through implementation of the method 300 and as depicted in the diagram 400, instead of generating and distributing seven sets of keys, the differential policy application apparatus 102 need only generate and distribute four sets of keys to enable the identified differential access to the atomic units 122a-122h by the workflow participants 110a and 110b. More particularly, the differential policy application apparatus 102 need only generate sets of keys for each of the tessellated regions A, B, C, and D. Thus, if each set of keys includes four keys, implementation of the method 300 in the example depicted by the diagram 400 represents a savings of 12 keys since only 16 keys instead of 28 keys would need to be generated. This also results in a savings in the number of operations that the differential policy application apparatus 102 is required to perform in applying the differential policies.

Some or all of the operations set forth in the figures may be contained as a utility, program, or subprogram, in any desired computer readable storage medium. In addition, the operations may be embodied by computer programs, which may exist in a variety of forms both active and inactive. For example, they may exist as software program(s) comprised of program instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 6:
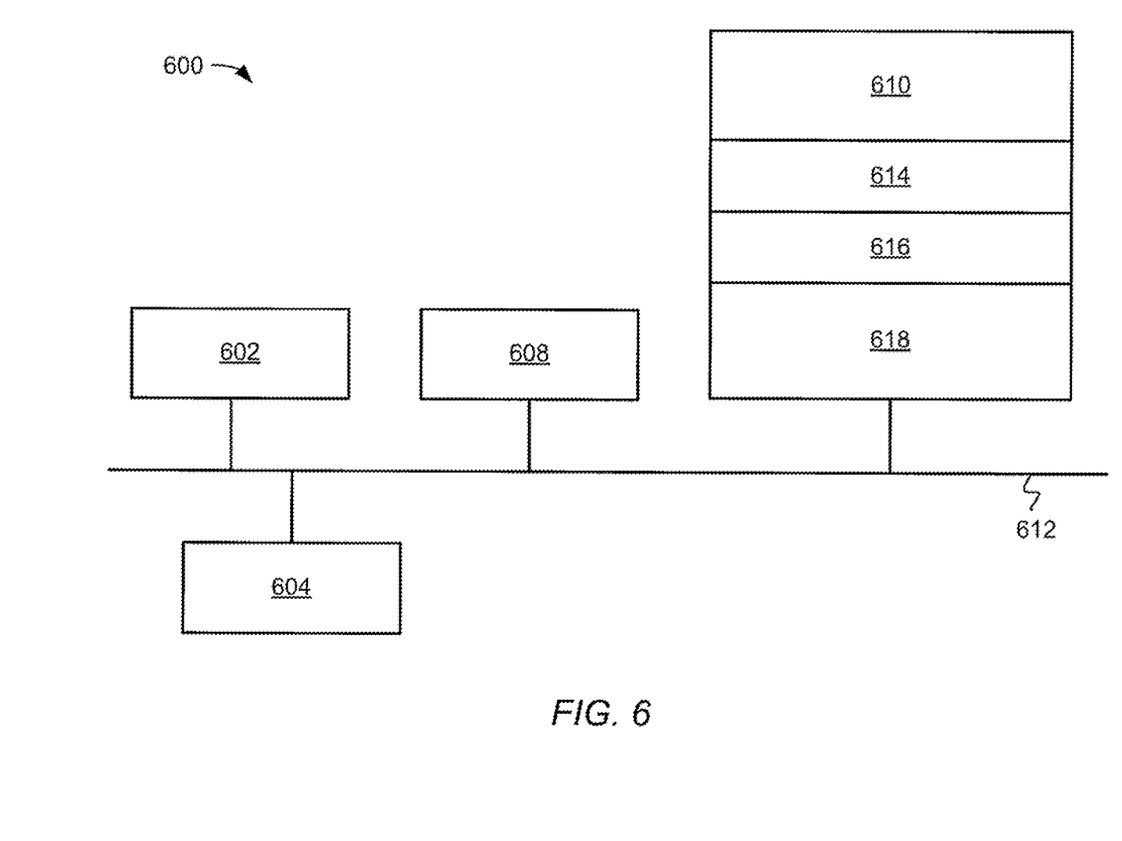
FIG. 6 shows a block diagram of a computer system that may be used as a platform for implementing or executing one or more of the processes depicted in FIGS. 3A-3C, according to an embodiment of the present invention.

Turning now to FIG. 6, there is shown a schematic representation of a computing device 600 configured in accordance with embodiments of the present invention. The device 600 includes one or more processors 602, such as a central processing unit; one or more display devices 604, such as a monitor; one or more network interfaces 608, such as a Local Area Network LAN, a wireless 802.11x LAN, a 3G mobile WAN or a WiMax WAN; and one or more computer-readable mediums 610. Each of these components is operatively coupled to one or more buses 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 610 may also store other software applications, including word processors, browsers, email, Instant Messaging, media players, and telephony software.

The computer-readable medium 610 may also store an operating system 614, such as Mac OS, MS Windows, Unix, or Linux; network applications 616; and a differential access control application 618. The operating system 614 may be multi-user, multiprocessing, multitasking, multithreading, real-time and the like. The operating system 614 may also perform basic tasks such as recognizing input from input devices, such as a keyboard or a keypad; sending output to the display 604; keeping track of files and directories on medium 610; controlling peripheral devices, such as disk drives, printers, image capture device; and managing traffic on the one or more buses 612. The network applications 616 includes various components for establishing and maintaining network connections, such as software for implementing communication protocols including TCP/IP, HTTP, Ethernet, USB, and FireWire.

The differential policy application 618 provides various software components for applying differential policies on at least one digital document among a plurality of workflow participants, as described above. In certain embodiments, some or all of the processes performed by the application 618 may be integrated into the operating system 614. In certain embodiments, the processes may be at least partially implemented in digital electronic circuitry, or in computer hardware, firmware, software, or in any combination thereof.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for applying differential policies on at least one digital document among a plurality of workflow participants, said at least one digital document comprising a plurality of atomic units, wherein the atomic units are assigned with at least one of a plurality of the differential policies, said method comprising:

tessellating, using a processor, the at least one digital document to identify the atomic units and the at least one of the differential policies assigned to the atomic units;

aggregating the atomic units into at least a first group of atomic units and a second group of atomic units according to the at least one of the differential policies assigned to the atomic units, wherein the atomic units in the first group of atomic units are assigned with a first policy and the atomic units in the second group of atomic units are assigned with a second policy, and wherein the first policy differs from the second policy;

associating a first set of keys to the first group of aggregated atomic units and a second set of keys to the second group of aggregated atomic units; and identifying a level of access to the atomic units to be simultaneously granted to each of the workflow participants based upon the differential policies assigned to the atomic units, wherein each of said sets of keys comprises at least one of an encryption key, a decryption key, a signature key, and a verification key and, for each of the atomic units, supplying the workflow participants identified to be granted a no access level with the verification key, while excluding the signature key, the encryption key, and the decryption key for that atomic unit;

supplying the workflow participants identified to be granted a read only access level with the decryption key and the verification key, while excluding the encryption and the signature keys for that atomic unit; and supplying the workflow participants identified to be granted with the modify access level with the encryption key, the decryption key, the signature key, and the verification key for the at least one atomic unit.

2. The method according to claim 1, wherein tessellating the at least one digital document comprises pulling the at least one digital document apart into atomic units that have been assigned with the plurality of differential policies.

3. The method according to claim 1, wherein the differential policies comprise security policies to provide differential access to the atomic units by the plurality of workflow participants, wherein tessellating the at least one digital document further comprises tessellating the at least one digital document to identify the differential policies assigned to the atomic units to each of the workflow participants.

4. The method according to claim 1, further comprising:
determining which of the atomic units are to be encrypted and signed based upon the policies assigned to the atomic units; and
for the atomic units determined to be encrypted and signed,
encrypting the atomic units using encryption keys respectively associated with the tessellated atomic units; and
signing the encrypted atomic units using signature keys respectively associated with the tessellated atomic units.

5. The method according to claim 1, wherein tessellating the at least one digital document further comprises employing one or more policy resolution rules to determine which of a plurality of policies to apply to the atomic units in instances where multiple policies apply to one or more of the atomic units.

6. The method according to claim 3, wherein tessellating the at least one digital document further comprises aligning the atomic units according to the differential policies assigned to the atomic units for each of the workflow participants.

7. The method according to claim 6, wherein tessellating the at least one digital document further comprises:
for each of the workflow participants,
determining whether sequential atomic units have been assigned the same policies; and
in response to a determination that sequential atomic units have been assigned the same policies, combining the sequential atomic units into policy regions.

8. An apparatus for applying differential policies on at least one digital document among a plurality of workflow participants, said at least one digital document comprising a plurality of atomic units, wherein the atomic units are assigned with at least one of a plurality of the differential policies, said apparatus comprising:

one or modules to tessellate the at least one digital document to identify the atomic units and the at least one of the differential policies assigned to the atomic units, to aggregate the atomic units into at least a first group of atomic units and a second of atomic units according to the at least one of the differential policies assigned to the atomic units, wherein the atomic units in the first group of atomic units are assigned with a first policy and the atomic units in the second group of atomic units are assigned with a second policy, and wherein the first policy differs from the second policy, and to associate a first set of keys to the first group of aggregated atomic units and a second set of keys to the second group of aggregated atomic units;

wherein the one or more modules are further to identify a level of access to the atomic units to be granted, simultaneously, to each of the workflow participants based upon the differential policies assigned to the atomic units, wherein each of said sets of keys comprise at least one of an encryption key, a decryption key, a signature key, and a verification key, and to, for each atomic unit, supply the workflow participants identified to be granted a no access level with the verification key, while excluding the signature key, the encryption key, and the decryption key for that atomic unit;

supply the workflow participants identified to be granted a read only access level with the decryption key and the verification key, while excluding the encryption and the signature keys for that atomic unit; and supply the workflow participants identified to be granted with the modify access level with the encryption key, the decryption key, the signature key, and the verification key for the at least one atomic unit; and a processor to implement the one or more modules.

9. The apparatus according to claim 8, wherein the differential policies comprise security policies to provide differential access to the atomic units by the plurality of workflow participants, and wherein the one or more modules are further to:
identify policies assigned to the atomic units for each of the workflow participants and to tessellate the at least one digital document to identify the differential policies assigned to the atomic units to each of the workflow participants.

10. The apparatus according to claim 8, wherein the one or more modules are further to align the atomic units according to the differential policies assigned to the atomic units for each of the workflow participants prior to tessellating the at least one digital document.

11. A non-transitory computer readable storage medium on which is embedded one or more computer programs, said one or more computer programs implementing a method for applying differential policies on at least one digital document among a plurality of workflow participants, said at least one digital document comprising a plurality of atomic units, wherein the atomic units are assigned with at least one of a plurality of the differential policies, said one or more computer programs comprising a set of instructions that when executed by a processor are to cause the processor to:

tessellate the at least one digital document to identify the atomic units and the at least one of the differential policies assigned to the atomic units;

aggregate the atomic units into at least a first group of atomic units and a second group of atomic units according to the at least one of the differential policies assigned to the atomic units, wherein the atomic units in the first group of atomic units are assigned with a first policy and the atomic units in the second group of atomic units are assigned with a second policy, and wherein the first policy differs from the second policy;

associate a first set of keys to the first group of aggregated atomic units and a second set of keys to the second group of aggregated atomic units; and identify a level of access to the atomic units to be simultaneously granted to each of the workflow participants based upon the differential policies assigned to the atomic units, wherein each of said sets of keys comprises at least one of an encryption key, a decryption key, a signature key, and a verification key and, for each of the atomic units, supply the workflow participants identified to be granted a no access level with the verification key, while excluding the signature key, the encryption key, and the decryption key for that atomic unit;

supply the workflow participants identified to be granted a read only access level with the decryption key and the verification key, while excluding the encryption and the signature keys for that atomic unit; and supply the workflow participants identified to be granted with the modify access level with the encryption key, the decryption key, the signature key, and the verification key for the at least one atomic unit.

* * * * *